Nov. 14, 1950　　　　P. L. ROZWOOD　　　　2,529,967
MOTOR VEHICLE STEERING APPARATUS
Filed March 29, 1948　　　　　　　　　　3 Sheets-Sheet 2
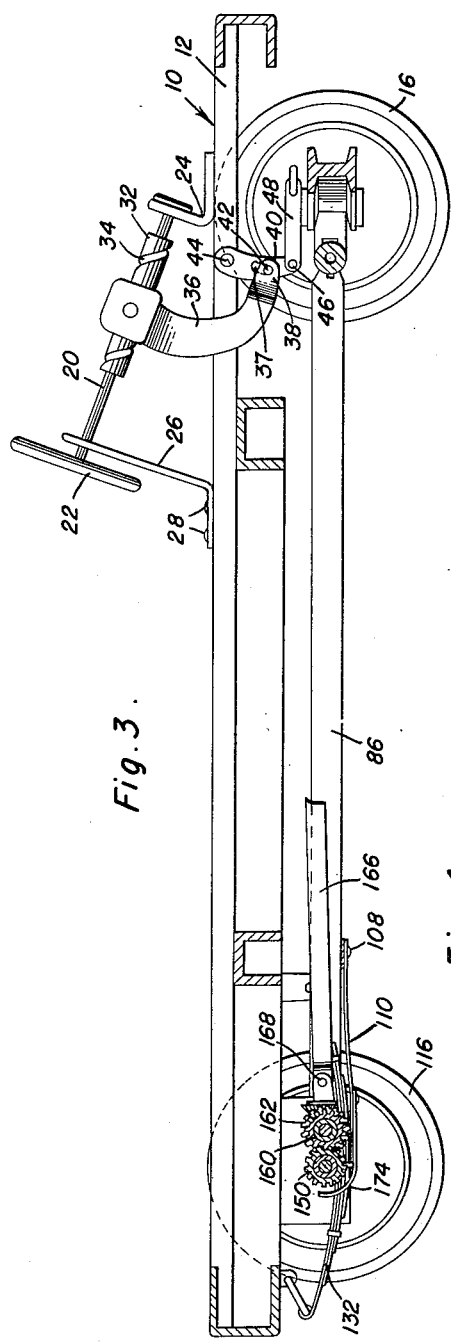
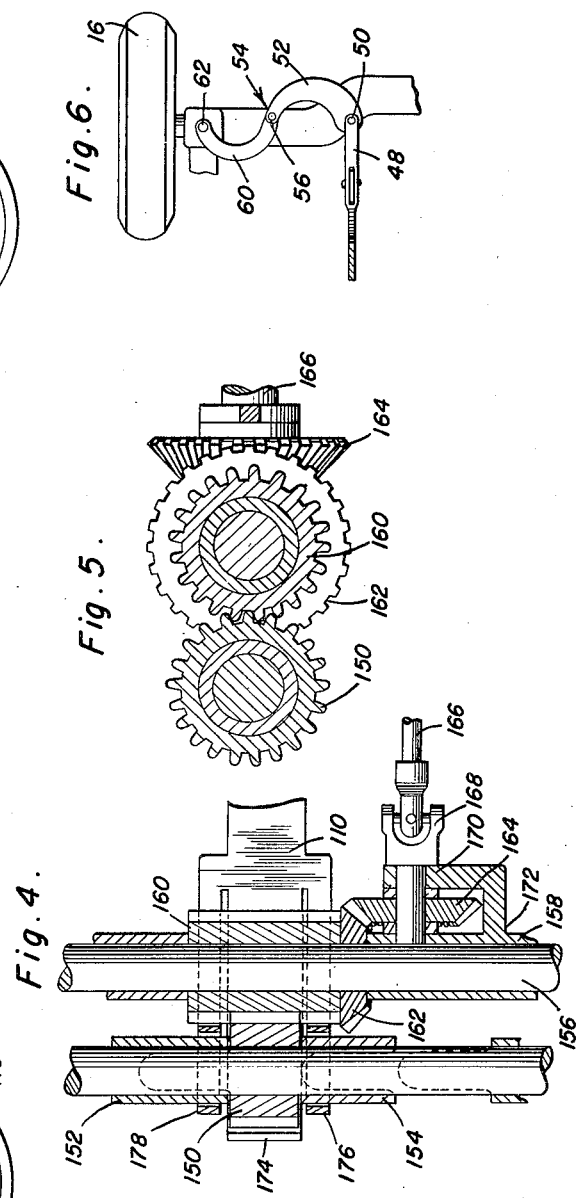
Peter L. Rozwood
INVENTOR.

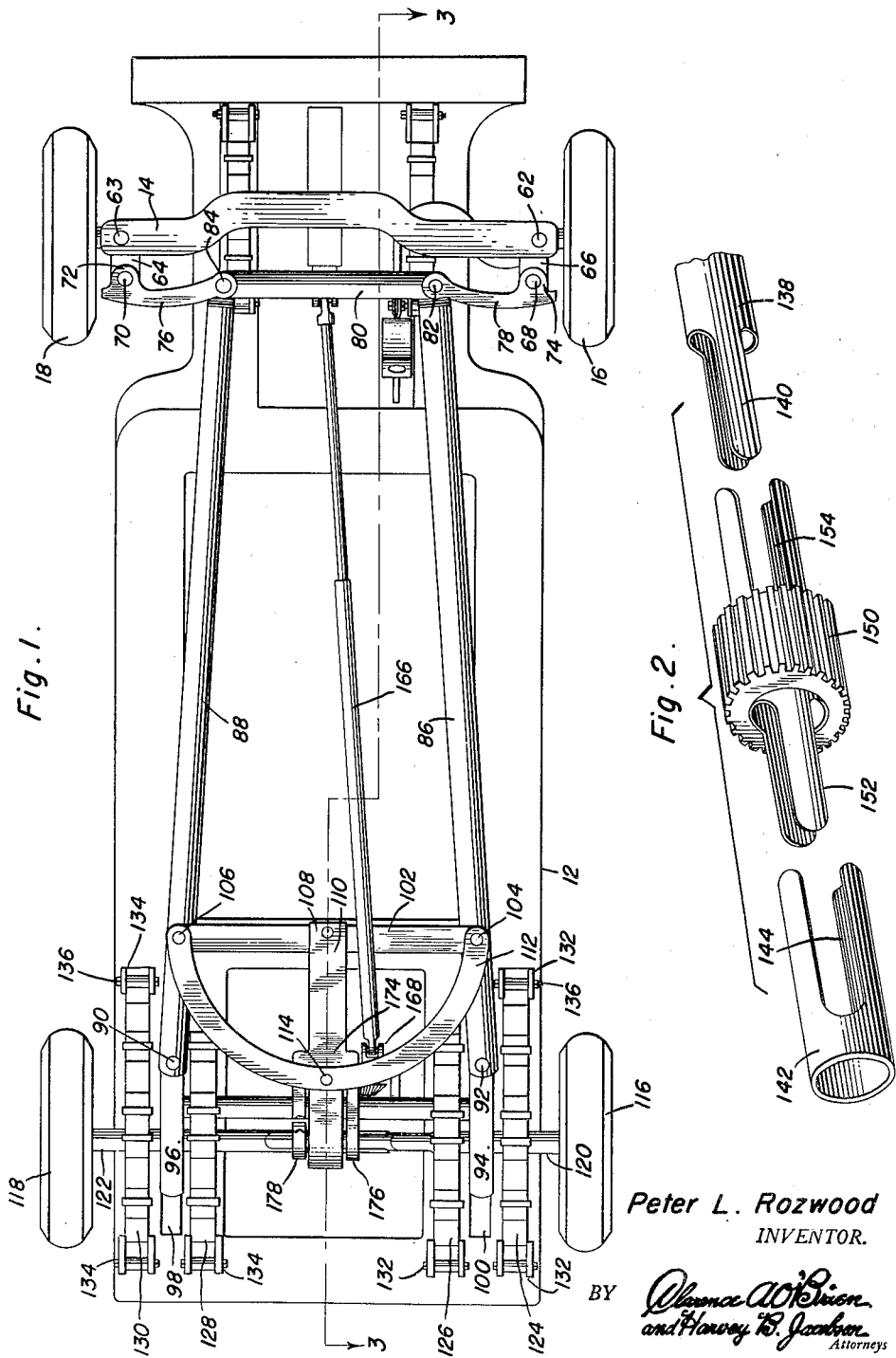

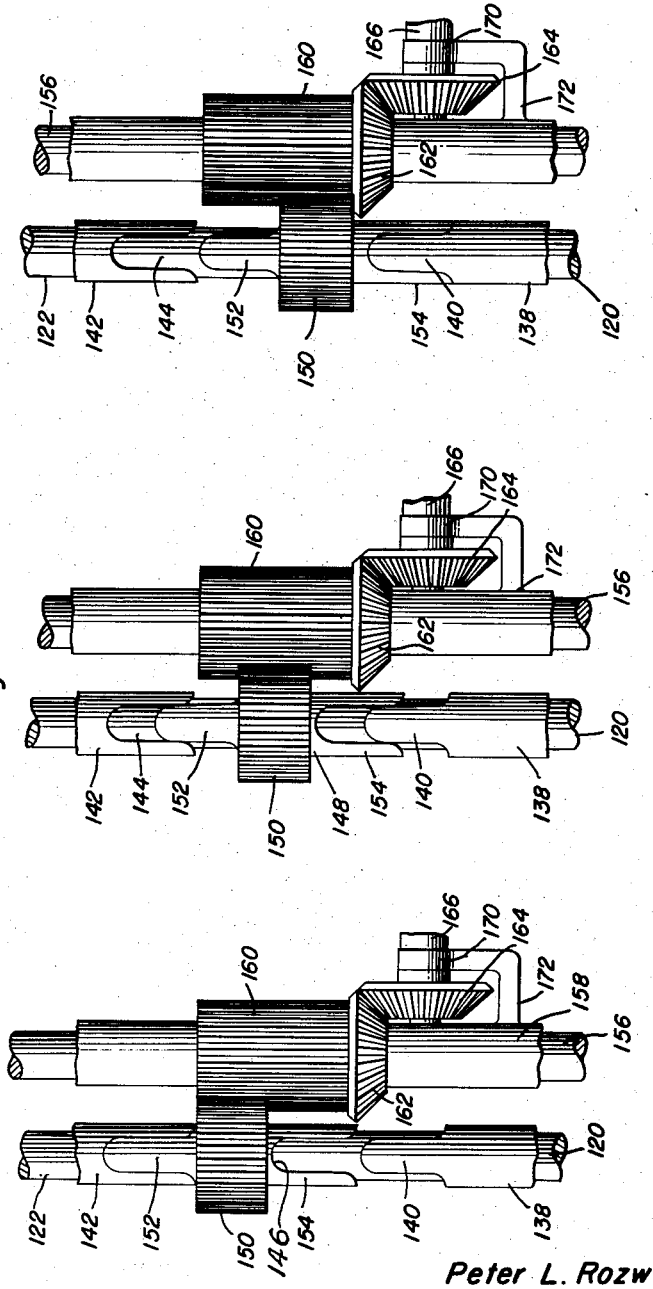

Patented Nov. 14, 1950

2,529,967

UNITED STATES PATENT OFFICE 2,529,967

MOTOR VEHICLE STEERING APPARATUS

Peter L. Rozwood, Passaic, N. J.

Application March 29, 1948, Serial No. 17,605

5 Claims. (Cl. 180—6.32)

1

This invention relates to improvements in a motor vehicle steering and driving mechanism and has for its principal object to selectively drive either both or one of the rear wheels, co-incidentally and correspondingly with the turning or predetermined path of travel of the front steering wheels.

Another object of this invention is to facilitate the transmission or communication of driving power to each of the rear wheels separately or simultaneously and to move the wheels selectively out of engagement with the driving power.

Another object of this invention is to facilitate and render more convenient the parking; sharp turning etc. of vehicles by enabling the rear wheels to be individually driven responsive to the sharp turning movement of the steering wheels.

Another object of this invention is to provide a mechanism for performing the above stated and other objects which is simple of construction, economical to manufacture and reliable and durable in operation and performance.

These and ancillary objects are attained by this invention a preferred embodiment of which, by way of illustration is set forth in the following description and illustrated in the accompanying drawings, wherein:

Figure 1 is a bottom plan view of a motor vehicle showing this invention applied thereto;

Figure 2 is a view in perspective of the structure provided for effecting the selective engagement with the driving power of the rear or driven wheels;

Figure 3 is a vertical sectional view taken on the longitudinal plane of lines 3—3 of Figure 1;

Figure 4 is an enlarged perspective view of the structure shown in Figure 2 and illustrated in association with the motor vehicle and the driving power, as shown generally in Figure 1;

Figure 5 is a sectional view of the gear arrangement shown generally in Figures 4 and 5;

Figure 6 is a detail enlarged structural view of the steering connection; and,

Figures 7, 8 and 9 are enlarged views illustrating the various selective positions of the gears, for driving the rear wheels, relative to the path of travel of the steering or front wheels.

Referring now more particularly to the drawings, wherein similar characters of reference designate corresponding parts throughout there is shown generally a motor vehicle 10, comprising a main frame 12 of the chassis, having secured thereto a front axle 14 with front wheels

2

16 and 18 attached to the ends thereof as customary and conventional.

Secured to the top of the frame in any suitable manner is a steering shaft 20 and an attached steering wheel 22, with the shaft 20 journaled in a bracket 24 secured to the frame and having its extended end received through a support or bearing bracket 26, which is seated on the frame and bolted thereto as at 28. Received on the medial portion of the shaft and keyed or otherwise secured thereon is a steering column 32, which is suitably spirally milled or grooved as at 34.

Received on the spirally grooved column or sleeve 32 and actuated thereby is a bracket arm 36, which depends in an arcuate shape and has a terminating bifurcation 38, which is pivoted to a pitman bar 40 by pivot pin 42 received in a suitable slot 37 in the bar. The pitman bar is pivoted as at 44 to the longitudinal side of the frame 12 and has its depending terminal pivoted by pin 46 to an actuating rod 48.

The rod 48 extends forwardly of the frame and is pivoted by pin 50 to an arcuate link 52 having its opposite rearwardly extending terminal pivoted as at 56 to a complementary oppositely directed link 60, the links 52 and 60 defining an S shaped linkage 54, with the terminating portion of link 60 pivoted by swivel pin 62 to the end of the lateral front axle 14. The swivel pin 62 extends through the end of the link 60 and joins an arm 66 to the underside of the axle 14, in pivotal attachment thereto. A similar pin 63 extends through the opposite end of the axle 14 and secures an arm 64 to the underside of the axle.

The arms 64 and 66 extend rearwardly of the axle and are pivoted as at 68 and 70 to the extending apertured ears 72 and 74 of intermediate lateral link rods 76 and 78, which are pivoted at their lateral terminals to a transverse pitman or cross bar 80 by pins 82 and 84.

Secured to the pins 82 and 84 in pivotal engagement with the link rods 76 and 78 and supported laterally by the cross bar 80 are longitudinally rearwardly extending actuating bars 86 and 88, which have their extending ends secured by pins 90 and 92 to slide bars 94 and 96 which are substantially H-shaped and are longitudinally slidably disposed in elongated slots 98 and 100 formed in the sides of the frame 12.

Pivotally secured to the actuating bars 86 and 88 adjacent their pivoted ends 92 and 90 is a cross support bar 102, which is attached pivotally at its ends by pins 104 and 106.

Projecting rearwardly and pinned as at 108 to the medial section of the cross support bar 102 is a central bracket extension 110, to be later described. An arcuate rigidifying piece 112 has its ends secured by pins 104 and 106 to the actuating bar 86 and 88 and is secured to the central extension 110 at its medial arcuate section by pin 114.

Rear wheels 116 and 118, of conventional description, are secured to axles 120 and 122, which extend through the slide bars 94 and 96, having suitable slots formed therein to accommodate the laterally inwardly projecting axles. Of course, conventional and customary elliptical springs 124, 126, 128 and 130 serve as shock absorbers and are longitudinally secured under the axles and have their ends received or seated in depending apertured channel brackets 132 and 134, which are welded to the frame. Suitable fastening means, such as bolt and nuts 136, extend through the apertures in the channel brackets and afix the springs thereto.

Keyed or otherwise permanently received on the extending ends of the axle 120 is a sleeve 138, having extending tongues 140 disposed on opposite sides thereof. Similarly received on the axle 122 is a sleeve 142, having oppositely disposed re-entrant grooves 144 formed on the extending end thereof.

Received within the sleeves 138 and 142 and freely rotatable therein is an idler shaft 146, which is positioned medially between the sides of the frame 12 and has received thereon a sleeve 148. The sleeve 148 centrally supports a gear 150 and has its oppositely extending ends formed in prongs or tongues 152 and grooves 154, both of which are oppositely disposed on the shaft 148 and extend above and below the shaft for a purpose to be later described.

Spaced in front of the gear 150 on the shaft 146 and transversely supported by the sides of the frame 12 is a secured shaft 156, which has suitably received thereon a bearing sleeve 158, upon which is rotatably received a transversely spread gear 160, which meshes with the gear 150, which is slidably positioned relative thereto. Supported on the sleeve 158 and secured to the end of gear 160 is a bevel gear 162, which is engaged by a bevel gear 164, keyed on the end of a drive shaft 166, with a suitable universal connection 168 interposed therein. A bearing bracket arm 170 supports the drive shaft 166 adjacent the sleeve 158 and has its attached end 172 suitably welded to the sleeve.

The central extension 110 has an extending enlarged substantially rectangular section 174, which is longitudinally slotted defining control arms 176 and 178, which are received around the sleeve 148 on each side of the gear 150 and extend around the sleeve and are welded to themselves. The middle portion serves as a cover piece for the gears 150 and 160 and terminates at a slight extended distance around the gear 150.

*General operation*

Referring now to Figures 1 and 8, the vehicle is shown in a straight path of travel and the rear wheels or drive wheels 116 and 118 are rotated together, through the medium of the drive shaft 166, which through the beveled gears 164 and 162 rotates the gear 160. Accordingly, the gear 150 is kept in a central engagement with the gear 160, due to the straight placement of the control arms 176 and 178, which respond to the directional path of the front wheels 16 and 18 and the opposite tongues 152 and 154 on each side integral with and extending from the gear are received or receive the tongue or prongs 140 of the axle 122 sleeve 138 and the grooves 144 of the sleeve 142, so that each axle 122 and 120 is rotated.

However, with respect to Figures 1, 3 and 7 of the drawings, when the steering wheel 22, for puroposes of turning is turned sharply to the right, the bracket arm 36, through the spinal grooved column 32 is pushed forwardly, moving the arcuate bar 40 on its frame pivot 44 and actuating the rod 48 forwardly. The rod 48, as seen in Figure 6, moves the link 52 and 60 and correspondingly turns the wheel 16 to the right. At the same time, the arm 66 is moved to the right, causing the lateral link rod 78 to pivot on pins 82 and pull bar 80 rearwardly, causing lateral rod 76 to be pushed, accenting arm 64 and turning wheel 18 to the right.

When the arm 78 is moved and bar 80 and arm 76 are moved in the above noted path the longitudinal actuating arm 86 is moved back and arm 88 is pulled forwardly. The arm 86, moving rearwardly, causes the slide bar 94 to move back in the slot 100 and likewise but conversely, the slide bar 96 is slid forwardly by bar 88. Thus, the arcuate bar 112 and support bar 102 are moved to the right causing arms 176 and 178 to slide the gear 150 along on gear 160 and moving the grooves 154 out of engagement with the tongues 140 of the right wheel 116 and urging the tongues 152 into engagement with groove 142. Thus wheel 118 is driven, while wheel 116 idles freely. It is to be noted that due to the curved extremities of the prongs and groove entrances the same correspond and are easily moved into actuated engagement by a sliding action responsive to the control arms 176 and 178.

With reference to Figure 9, there is shown the gear assembly, when wheel 116 is driven and wheel 118 idles. The actuation of the gear 150 and corresponding sleeve 148 and engaging components is controlled by the arms 176 and 178, which in turn react to the turning of the front wheels, by means of the above described linkage system.

However, since many other purposes and modifications of this invention will become apparent to those skilled in the art, upon a perusal of the foregoing disclosure, in view of the accompanying drawings, it is to be understood that certain changes in size, style and arrangement of parts may be effected thereon, without a departure from the spirit of the invention and within the scope of the appended claims.

Having described the invention, what is claimed as new is:

1. A steering and running mechanism for a four wheel motor vehicle comprising a frame, a pair of steerable wheels carried by said frame, a steering column mounted on said frame, a depending bracket arm actuated by said column, a steering linkage connected between said arm and said wheels, a pair of longitudinal actuating arms pivoted to said steering linkage and responsive to movement thereof, a rear wheel assembly carried by said frame including a pair of axles having wheels journaled on their extending ends, an intermediate idler shaft interposed between said axles, a rigid shaft transversely carried by the frame in spaced proximity to the idler shaft, a sleeve slidably positioned on said idler shaft, oppositely extending prongs and grooves on said sleeve, complementary engaging elements carried by said axles, means responsive to the longitudinal movement of the actuating arms for slidably moving said idler shaft sleeve on the shaft, a gear carried by said sleeve, a driving gear on said rigid shaft in constant engagement with the sleeve gear, bevel gears in engagement with said driving gear, a drive shaft connected to one of the bevel gears.

2. A steering and running mechanism for a power-driven vehicle comprising a frame, a pair of steerable wheels carried by said frame, a steering linkage for said wheels, a pair of longitudinally extending actuating arms pivoted to said steering linkage and responsive to movement thereof, a driving wheel assembly carried by said frame including a pair of axles having wheels journaled on their extending ends, an idler shaft interposed between said axles, a rigid shaft carried by said frame parallel to said idler shaft, a driving gear on said rigid shaft, a sleeve slidably and rotatably disposed on said idler shaft, a gear fixed on said sleeve in constant mesh with said driving gear, means carried by said axles for operatively securing said axles to said sleeve, means controlled by said actuating arms for selectively moving said sleeve into engagement with said preceding means.

3. A steering and running mechanism for a power-driven vehicle comprising a frame, a pair of steerable wheels carried by said frame, a steering linkage for said wheels, a pair of longitudinally extending actuating arms pivotally connected to said steering linkage and responsive to movement thereof, a driving wheel assembly carried by said frame and including a pair of axle sections having wheels journaled on the extending ends thereof, an intermediate idler shaft interposed between said axles, a driving shaft, a driving gear carried by said driving shaft and disposed adjacent said idler shaft, a sleeve slidably and rotatably disposed on said idler shaft, a gear fixed on said sleeve and disposed in constant mesh with said driving gear, sleeves fixed on said axles, means for connecting said sleeves to the shaft sleeve for driving said axles, an actuating assembly for moving said sleeve selectively into engagement with the axle sleeves and means operatively connected to said actuating arms for operating said actuating assembly.

4. The combination of claim 3, wherein said actuating assembly includes a pair of control arms disposed around the shaft sleeve on opposite sides of the shaft gear.

5. The combination of claim 3, wherein said last-named means includes a frame pivotally secured transversely between the extending ends of the arms, guide slots in said frame and guide members slidably disposed in said slots and pivotally attached to said arms.

PETER L. ROZWOOD.

REFERENCES CITED

The following references are of record in the file of this patent:

UNITED STATES PATENTS

| Number | Name | Date |
| --- | --- | --- |
| 759,559 | Scott | May 10, 1904 |
| 1,139,634 | Brisson | May 18, 1915 |
| 1,367,309 | Dunham | Feb. 1, 1921 |
| 1,894,698 | Markham | Jan. 13, 1933 |
| 2,055,860 | Faries et al. | Sept. 29, 1936 |

FOREIGN PATENTS

| Number | Country | Date |
| --- | --- | --- |
| 535,398 | France | Apr. 13, 1922 |
| 269,432 | Great Britain | Apr. 21, 1927 |